(12) United States Patent
Shumka et al.

(10) Patent No.: US 11,340,193 B2
(45) Date of Patent: May 24, 2022

(54) FORM-FITTING EDDY CURRENT ARRAY SENSOR AND METHOD OF USE THEREOF

(71) Applicant: GLOBAL INSPECTIONS NDT, INC., Kelowna (CA)

(72) Inventors: Thomas Shumka, Kelowna (CA); Jason Shumka, Kelowna (CA)

(73) Assignee: Global Physical Asset Management, Inc. (CA)

( * ) Notice: Subject to any disclaimer, the term of this patent is extended or adjusted under 35 U.S.C. 154(b) by 103 days.

(21) Appl. No.: 16/481,243

(22) PCT Filed: Jan. 15, 2018

(86) PCT No.: PCT/CA2018/000009
§ 371 (c)(1),
(2) Date: Jul. 26, 2019

(87) PCT Pub. No.: WO2018/137022
PCT Pub. Date: Aug. 2, 2018

(65) Prior Publication Data
US 2020/0049662 A1    Feb. 13, 2020

(30) Foreign Application Priority Data
Jan. 27, 2017   (CA) ..................... 2956749

(51) Int. Cl.
*G01N 27/904*  (2021.01)
*G01N 27/90*   (2021.01)
*G01M 13/02*   (2019.01)

(52) U.S. Cl.
CPC .......... *G01N 27/904* (2013.01); *G01M 13/02* (2013.01); *G01N 27/9006* (2013.01)

(58) Field of Classification Search
None
See application file for complete search history.

(56) References Cited

U.S. PATENT DOCUMENTS

| | | | | |
|---|---|---|---|---|
| 5,136,527 | A | * | 8/1992 | Koretz .................. G01B 7/283 33/504 |
| 5,278,498 | A | | 1/1994 | Vernon |

(Continued)

FOREIGN PATENT DOCUMENTS

| CA | 2943475 A1 | 10/2015 |
|---|---|---|
| EP | 1 403 635 | 6/2009 |
| EP | 1 202 053 | 1/2014 |

OTHER PUBLICATIONS

WIPO, Canadian International Searching Authority, International Search Report dated Apr. 16, 2018, International Patent Application No. PCT/CA2018/000009, 3 Pages.

(Continued)

*Primary Examiner* — Nasima Monsur
(74) *Attorney, Agent, or Firm* — Baumgartner Patent Law; Marc Baumgartner (57) ABSTRACT

A form-fitting eddy current array probe for inspecting helical gears is provided, the probe comprising: a leg which includes a sensor zone with a plurality of eddy current arrays; an arm attached to and normal with the leg to provide an L-shaped probe, the arm including a sensor zone with a plurality of eddy current arrays; a resilient layer underlying the sensor zones; a gel layer attached to an upper surface of the sensor zones, the gel layer including a fluid gel and an outer covering encasing the fluid gel; and an encoder distally located on the leg. A method of inspecting a girth gear set including a helical gear and a girth gear using the form-fitting eddy current array probe is also provided.

17 Claims, 5 Drawing Sheets

(56) References Cited

U.S. PATENT DOCUMENTS

| | | | |
|---|---|---|---|
| 5,315,234 A * | 5/1994 | Sutton, Jr. | G01N 27/904 |
| | | | 324/232 |
| 5,801,532 A | 9/1998 | Patton | |
| 6,677,859 B1 | 1/2004 | Bensen | |
| 6,812,697 B2 | 11/2004 | McKnight et al. | |
| 6,912,917 B2 | 7/2005 | Brugger et al. | |
| 7,952,348 B2 * | 5/2011 | Sun | G01N 27/9006 |
| | | | 324/240 |
| 8,237,433 B2 | 8/2012 | Goldfine | |
| 8,264,221 B2 | 9/2012 | Faucher | |
| 2004/0004475 A1 * | 1/2004 | Goldfine | G01N 27/82 |
| | | | 324/242 |
| 2016/0025682 A1 | 1/2016 | Walker | |

OTHER PUBLICATIONS

WIPO, Canadian International Searching Authority, Written Opinion of the International Searching Authority dated Apr. 16, 2018, International Patent Application No. PCT/CA2018/000009, 5 Pages.
Brochure entitled "Eddyfi Surface Eddy Current Array Probes", Aug. 20, 2018.

* cited by examiner

FIG. 1

LEGEND
form-fitting eddy current array (ECA) probe 10
resilient layer 12
lower surface 14
sensor zone 16
adhesive 18
sensing coils 20
drive coils 22
gel layer 30
outer covering 32
gel 34
face 36
upper surface 38
top 40
holder 42
handle 46
upper surface 48

FIG. 2

LEGEND
sensors 124
conformable layer 126
eddy current array 142
multiplexer 148
data channels 150

FORM-FITTING EDDY CURRENT ARRAY SENSOR AND METHOD OF USE THEREOF

CROSS REFERENCE TO RELATED APPLICATIONS

This application is a U.S. national phase of International Application No. PCT/CA2018/000009, filed Jan. 15, 2018, and is related to, and claims the benefit of, Canadian Patent Application No. 2,956,749, filed Jan. 27, 2017. The above-identified priority patent applications are incorporated herein by reference in their entirety.

FIELD

The present technology provides a form-fitting, resilient eddy current array sensor that conforms, in situ, to the shape being inspected and a non-destructive method of large open gearing for discontinuities.

The form-fitting eddy current sensor array may also be used for final inspection during the gear manufacturing process. More specifically, the method uses a conformable, resilient eddy current sensor array to assess the integrity of both large girth and pinion (helical) gears on site and in situ. The device and method are especially useful for helical gears.

BACKGROUND

Eddy current technology is a widely used for quality control testing on objects such as wire, rods or tubes. This testing often involves having the test objects travel along a work path, passing through eddy current probe(s). The operators are competent as they routinely conduct tests.

Eddy current testing can be performed on discs and other shaped objects constructed of conductive and/or non-magnetic materials to look for defects and wear. Eddy current testing may use eddy current coils designed to generate a changing magnetic field that may interact with the disc to generate an eddy current. Variations in the phase and magnitude of the generated eddy current may be measured by measuring changes to the current flowing in the coil. Alternatively, changes in phase and magnitude of the generated eddy current may be measured using a second coil. Changes in the phase and magnitude of the generated eddy current may indicate one or more flaws in the discs, such as small cracks that may lead to failures if not addressed. Due to their small size and rigidity, such probes make inspection of large discs and other large components that have varying and multiple geometries difficult and time-consuming, and therefore expensive.

Eddy current sensor arrays (ECA), as opposed to eddy current sensors, have been employed to measure stress on airplane parts, for example, on the landing gear, and to measure weights of components. For example, U.S. Pat. No. 8,237,433 discloses methods for monitoring of stresses and other material properties. These methods use measurements of effective electrical properties, such as magnetic permeability and electrical conductivity, to infer the state of the test material, such as the stress, temperature, or overload condition. The sensors, which can be single element sensors or sensor arrays, can be used to periodically inspect selected locations, mounted to the test material, or scanned over the test material to generate two-dimensional images of the material properties. Magnetic field or eddy current based inductive and giant magneto-resistive sensors may be used on magnetizable and/or conducting materials, while capacitive sensors can be used for dielectric materials. Methods are also described for the use of state-sensitive layers to determine the state of materials of interest. These methods allow the weight of articles, such as aircraft, to be determined. The operators are competent as they routinely conduct testing.

Eddy current arrays can also be used in production and inspection lines. For example, U.S. Pat. No. 8,264,221 discloses an eddy current probe assembly suitable for inspecting a test object with longitudinal shape, being passed through the assembly in the object's axial direction during an inspection session, the probe assembly comprising multiple probe modules being disposed in a radial plane and with the modules partially overlaying on each other forming an IRIS structure encircling an inspection zone, wherein a movement in unison of each of the probe modules closer to or further away from the center of the inspection zone makes the inspection zone enlarged or contracted. Spring tension is applied on each of the probe modules so that constant life-off in maintained between the probe modules and the test surface. Array of eddy current elements for each probe module and multiple layers of probe modules can be employed to achieve complete coverage of the test surface. The radial cross-sectional shapes of the test objects can be of round or polygonal. Again, testing is routine and therefore the operators are competent.

U.S. Pat. No. 5,315,234 discloses an eddy current device for inspecting a component includes an eddy current array circuit having respective pluralities of drive and sense elements and having an active face for positioning on a surface of the component during the inspection operation. A backing is disposed on a face of the eddy current array circuit opposite to the active face for concentrating an electromagnetic flux from the eddy current array circuit into the component when each of the plurality of drive elements is being energized. A mechanical arrangement is provided for supporting and deploying the backing and the array circuit to substantially conform with the surface portion under inspection and to cause each of the pluralities of drive and sense elements to be maintained at their respective substantially constant distances from the inspection surface during scanning, preferably at a controlled rate of scan. The distance is maintained using an inner backing or core, which is preferably a flexible, compressible material, such as a soft elastomeric material, an open or closed cell foam or the like, for applying a uniform pressure behind the array circuit and against the inspection surface to maintain the array elements at their substantially constant respective distances from the inspection surface. Regardless of whether there is an inner backing or a core, the shape of the probe is invariant as a rigid material is molded or shaped to conform to the desired shape of the surface of the component to be inspected.

A flexible eddy current probe, as opposed to an eddy current array (ECA) probe, is disclosed in U.S. Pat. No. 5,801,532. It can be moved by hand to a surface to be tested. A toroidal-shaped first resilient member contacts the bottom face of a support member. An elastic membrane extends over the bore of the first resilient member, contacts the bottom lateral surface of the first resilient member, and is unattached to the radially-inward-facing surface of the first resilient member. A more elastic, second resilient member is placed in the bore, is unattached to the first resilient member, and contacts the bottom surface of the elastic membrane. A flexible, surface-conformable, eddy current sensing coil overlies a portion of the bottom side of the second resilient member. The first resilient member is disclosed to comprise: a gel ring generally coaxially aligned with the longitudinal axis and attached to the first face of the base plate; a foam ring generally coaxially aligned with the longitudinal axis and longitudinally attached to the gel ring; and an annular rubber contact shield generally coaxially aligned with the longitudinal axis and longitudinally attached to the foam ring. Preferably, the gel ring consists essentially of RTV silicone, which has a Shore A durometer rating of 15 Shore A to 40 Shore, the foam ring consists essentially of neoprene sponge rubber (which is always more elastic than the foam ring).

The second resilient member, which is in contact with the sensing coil, has a coefficient of elasticity which is greater than that of the first resilient member. Therefore, the probe disclosed in U.S. Pat. No. 5,801,532 has a conformable holder, but the area of the probe that includes the sensing coils is quite stiff and would not be able to form to the shape being inspected.

U.S. Pat. No. 5,278,498 discloses a flexible core eddy current probe, again as opposed to an ECA, for testing of curved or regular surfaces. The core is comprised of a flexible binder loaded with a powdered magnetic material and then formed into a specific flexible core shape continuously adaptable to irregular or curved surfaces. The flexible core probe has specific application to carbon fiber reinforced composite components having contoured surfaces.

Flexible probes that are strap-like have been disclosed. These can be pressed into round-edged shapes, for example, pipeline, tube inspection, and aircraft. However, they are only useful for assessing wear and integrity of smooth surfaces and are subject to wear if used on hard edges or rough surfaces. They are also subject to differential pressure being exerted by the user as the user pushes on the flexible probe with their fingers.

A patent pending flexible probe array (FPA) (US Publication No. 20160025682) configured in a glove that can be worn by an inspector has been disclosed. The FPA conforms to the inspection surface and allows inspection of a wide region with each scan of the array. With this arrangement, the operator receives tactile feedback of surface profile changes and is able to adjust the pressure on the FPA to accommodate changing geometries. The FPA approach eliminates the need to maintain probe alignment and the raster scanning needed with a conventional probe. The system has been successfully demonstrated at four operating power plants. A major deficiency is that it relies heavily on the proficiency of the user and therefore there is a risk of human error. Further, the results would vary from operator to operator as there is no accurate feedback to the operator to ensure consistency between operators. In addition, the scan coverage on the glove is very small. Still further, the flexible probe would be ill suited for environments where there is dust, dirt and potentially an abrasive test surface.

Flexible eddy current array probes have been designed and used for assessing pipes both during manufacture and in the field. A T-probe, designed by Eddyfi (http://www.eddyfi.com/surface-probes/) has an encoder at the base of the T and the eddy current array sensors on the two arms of the probe. A user holds the probe on the arms and slides it over the surface being inspected. Similarly, they have an I-probe with the encoder at one end and the sensor along the remainder of the length.

EP-A-1 202 053 discloses eddy current inspection of a contoured surface of a workpiece by forming a backing piece of flexible, resiliently yieldable material with a contoured exterior surface conforming in shape to the workpiece contoured surface. It is apparent that the probe is shaped for the specific shape to be inspected and retains that shape.

EP 1 403 635 discloses a molded flexible eddy current array probe that is formed into a shape that conforms to a specific shape of article being inspected. It is clear that the flexible material has limited flexibility as integral anchors serve to retain the flexible material to the insert. A Shore A durometer rating of 20 A to about 80 A is cited, however, the example of a suitable flexible material is TC 5050 RTV compound, available from BJB Enterprises, Inc., 14791 Franklin Avenue, Tustin, Calif. 92780, which has a Shore A durometer hardness of 50 A (equivalent to a pencil eraser). It is apparent that the probe may have some flexibility, however, it is not a conformable probe as the flexible material is able to retain slots, a recess and to form pins and retains a specific shape.

In the mining and cement industry, very large gears are employed. For example, the girth gear in a mill has straight cut teeth and is about 3 m to about 14 m in diameter. The pinion gear drives the girth gear. It is much smaller, at about 0.5 m to about 2 m diameter. It has helix angles on the gear teeth. These gears cannot be readily removed and transported for testing. The helical gears are especially challenging as the gears are arranged in a helix with the angle of the teeth ranging between about 2 degrees to about 15 degrees. The addendum, dedendum and root of the gear teeth are all assessed.

What is needed therefore is a device and method suited to field testing to accurately and quickly identify anomalies or defects on the flanks (addendum and dedendum) and root of the gear teeth, including, but not limited to pits, scuffing, and cracks. The method would preferably not rely on visual inspection or human interaction. The device and method would also preferably be useful for different shapes and sizes of gear teeth, including helical gears. As there are different shapes of helical gears and the addendum and dedendum of an individual gear tooth have different profiles, it would require that the device be form-fitting in situ, in other words, continuously adaptable. The device would preferably be long lived and have a low friction, resilient surface. It would be advantageous if the resulting data were sent directly to a computer, analyzed, displayed in two or three dimensions (C-Scan), or both and archived.

SUMMARY

The present technology provides a device and method suited to field testing to accurately and quickly identify anomalies or defects on the flanks (addendum and dedendum) and root of the gear teeth, including, but not limited to pits, scuffing, and cracks. The method does not rely on visual inspection or human interaction. The device and method are useful for different shapes and sizes of gear teeth, including helical gears. As there are different shapes of helical gears and the addendum and dedendum of an individual gear tooth have different profiles, the device is form-fitting in situ, in other words, continuously adaptable or having a variable shape. The device is long lived and has a resilient, low friction surface. The resulting data are sent directly to a computer, analyzed, displayed in two or three dimensions (C-Scan), or both and archived.

In one embodiment, a form-fitting eddy current array probe for inspecting helical gears, the probe comprising: a leg which includes a sensor zone with a plurality of eddy current arrays; an arm attached to and normal with the leg to provide an L-shaped probe, the arm including a sensor zone with a plurality of eddy current arrays; a resilient layer underlying the sensor zones; a gel layer attached to an upper surface of the sensor zones, the gel layer including a fluid gel and an outer covering encasing the fluid gel; and an encoder distally located on the leg.

In the probe, the fluid gel may have a viscosity of about 100 to about 250 Pascal seconds (Pas).

The probe may further comprise a holder, the holder attached to an upper surface of the outer covering on at least a part of one or more of the leg or the arm.

In the probe, the outer covering may have a modulus of elasticity of about 0.1 to about 0.5 $10^9$ N/m$^2$.

In the probe, the resilient layer may be replaceable and retained on the sensor zone with adhesive.

In the probe, the resilient layer may comprise polytetrafluoroethylene.

In the probe, the resilient layer may be a tape.

In another embodiment, a method of inspecting at least one tooth of a gear is provided, the method comprising a user pressing a form-fitting eddy current array probe onto a root and an adjacent flank of the tooth with a force sufficient for the probe to mold, in situ, to the root and the adjacent flank and scanning the root and the adjacent flank with the so-molded probe.

In the method, the probe may mold, in situ, to the addendum and the dedendum of the flank.

In the method, the gear may be a helical gear or a girth gear.

The may further comprise inspecting a plurality of teeth.

The method may further comprise inspecting a plurality of teeth from each of a helical gear and a girth gear, thereby inspecting a girth gear set.

In the method, the helical gear may have a tooth angle of about 7 degrees to about 10 degrees.

In the method, the helical gear may have a tooth angle of about 7 degrees to about 8 degrees.

In another embodiment, a method of scanning at least one tooth of a gear is provided, the method comprising a user pressing a form-fitting eddy current array probe onto a root and an adjacent flank of the tooth with a force sufficient for the probe to mold, in situ, to the root and the adjacent flank and moving the so-molded probe along a length of the root and the adjacent flank, the form-fitting eddy current array probe comprising: a leg which includes a sensor zone with a plurality of eddy current arrays; an arm attached to and normal with the leg to provide an L-shaped probe, the arm including a sensor zone with a plurality of eddy current arrays; a resilient layer underlying the sensor zones; a gel layer attached to an upper surface of the sensor zones, the gel layer including a fluid gel and an outer covering encasing the fluid gel; and an encoder distally located on the leg.

In the method, the probe may mold, in situ, to the addendum and the dedendum of the flank.

In the method, the gear may be a helical gear or a girth gear.

The method may further comprise scanning a plurality of teeth.

The method may further comprise scanning plurality of teeth from each of a helical gear and a girth gear, thereby inspecting a girth gear set.

In another embodiment, a method of inspecting an at least one pinion gear on site is provided using a system comprising a form-fitting eddy current sensor array probe in electronic communication with a computing device, the computing device having a processor and a memory, the memory to provide instructions to the processor, the form-fitting eddy current sensor array probe comprising: a leg which includes a sensor zone with a plurality of eddy current arrays; an arm attached to and normal with the leg to provide an L-shaped probe, the arm including a sensor zone with a plurality of eddy current arrays; a resilient layer underlying the sensor zones; a gel layer attached to an upper surface of the sensor zones, the gel layer including a fluid gel and an outer covering encasing the fluid gel; and an encoder distally located on the leg, the method comprising: a user pressing the form-fitting eddy current array probe onto a root and an adjacent flank of each tooth with a force sufficient for the probe to mold, in situ, to the root and the adjacent flank; standardizing the eddy current sensor array probe with a reference standard; scanning the at least one gear with an alternating current; sending a data set to the computing device; the computing device analyzing the data set; and the computing device displaying one or more of a two or three-dimensional image of the data set on a user interface.

The method may further comprise multiplexing the data set.

The method may further comprise the computing device archiving the data set.

In the method, the probe may mold, in situ, to the addendum and the dedendum of the flank.

The method may further comprise inspecting a plurality of teeth from a girth gear and the pinion gear of a girth gear set, thereby inspecting the girth gear set.

In the method, the pinion gear may have a tooth angle of about 7 degrees to about 15 degrees.

In the method, the pinion gear may have a tooth angle of about 7 degrees to about 8 degrees.

In the method, on site may be a mine site.

DESCRIPTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

DEFINITIONS

Form-fitting—in the context of the present technology, form-fitting means that the shape of the device, and more specifically, the sensor area changes in response to different shapes of structures being inspected, for example, forming to the shape of one helical gear and then forming to the shape of a second helical gear. The form changes in situ.

In situ—in the context of the present technology, in situ refers to in place on the structure to be inspected.

Continuously adaptable—in the context of the present technology, continuously adaptable means that the sensor area, at least, can change form on the fly to conform to the surface being inspected. This can also be defined as variable shaped or having a variable shape or having a shape that can be varied.

Fluid gel—in the context of the present technology, a fluid gel is a gel that will flow when disturbed, for example, when pressed between two surfaces, for example, but not limited to between a surface to be inspected and a user's fingers or hand or a holder.

DETAILED DESCRIPTION

Figure 1:
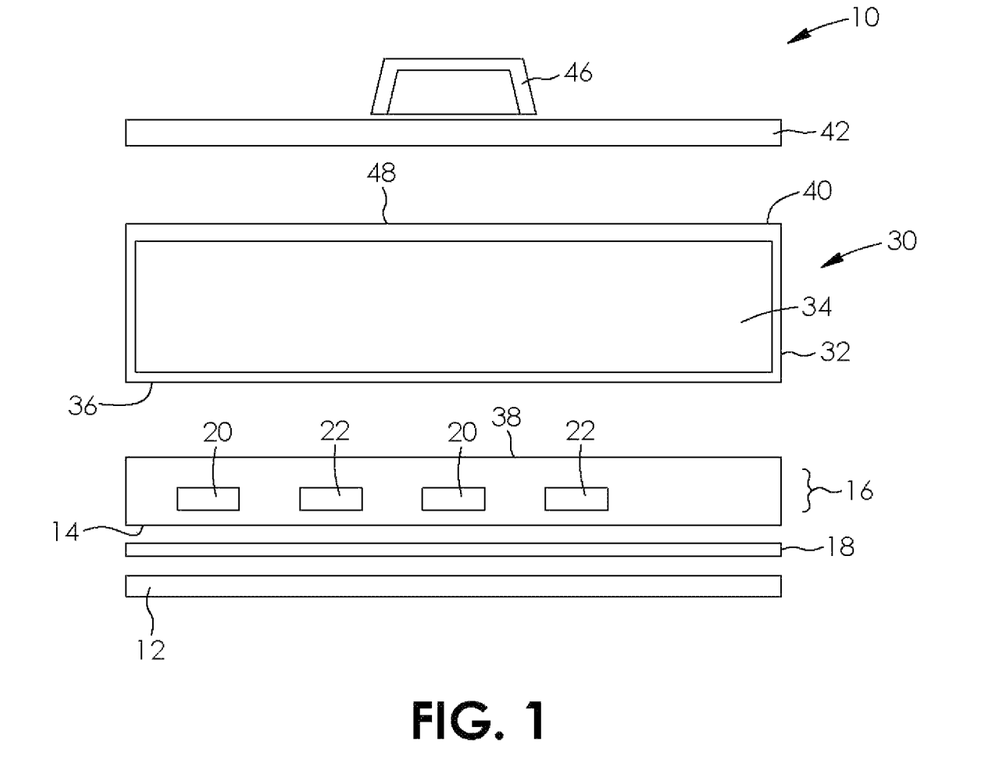
FIG. 1 is an exploded sectional view through the form-fitting eddy current array probe of the present technology.

A form-fitting eddy current array (ECA) probe, generally referred to as 10 is shown in FIG. 1. The probe has a resilient layer 12 for contacting the surface to be inspected. The resilient layer 12 is replaceable and is preferably Polytetrafluoroethylene (Teflon®) tape about 0.10 to about 0.25 mm thick. The resilient layer 12 is retained on the lower surface 14 of the sensor zone 16 with an adhesive 18. Alternatively, the resilient layer is a removable Ultra-High Molecular Weight (UHMW) adhesive-backed flexible plastic. In the sensor zone 16 are a plurality of coils that include sensing coils 20 and drive coils 22. Above, and attached to the sensor zone 16 is a gel layer, generally referred to as 30. The gel layer 30 includes an outer covering 32 and the gel 34, which is contained within. The gel is a fluid gel 34 with a viscosity of about 100 to about 250 Pascal second (Pas) at 25° C. The outer covering 32 has a low modulus of elasticity and can readily change shape with the gel 34. The gel layer 30 has a Shore OO durometer rating of about 20 to about 30. Both the outer covering 32, at least on the face 36 that is attached to an upper surface 38 of the sensor zone 16 and the fluid gel 34 need to be form-fitting. A top 40 of the outer covering 32 may have a higher modulus of elasticity. In one embodiment, the gel layer 30 is sandwiched between the sensor zone 16 and a holder 42 that retains the gel layer 30. The holder 42 may include a handle 46. The holder 42 covers at least a portion of the upper surface 48 of the outer covering 32. In another embodiment, the top 40 may function as the holder. In another embodiment, the gel layer and the holder are absent.

Figure 2:
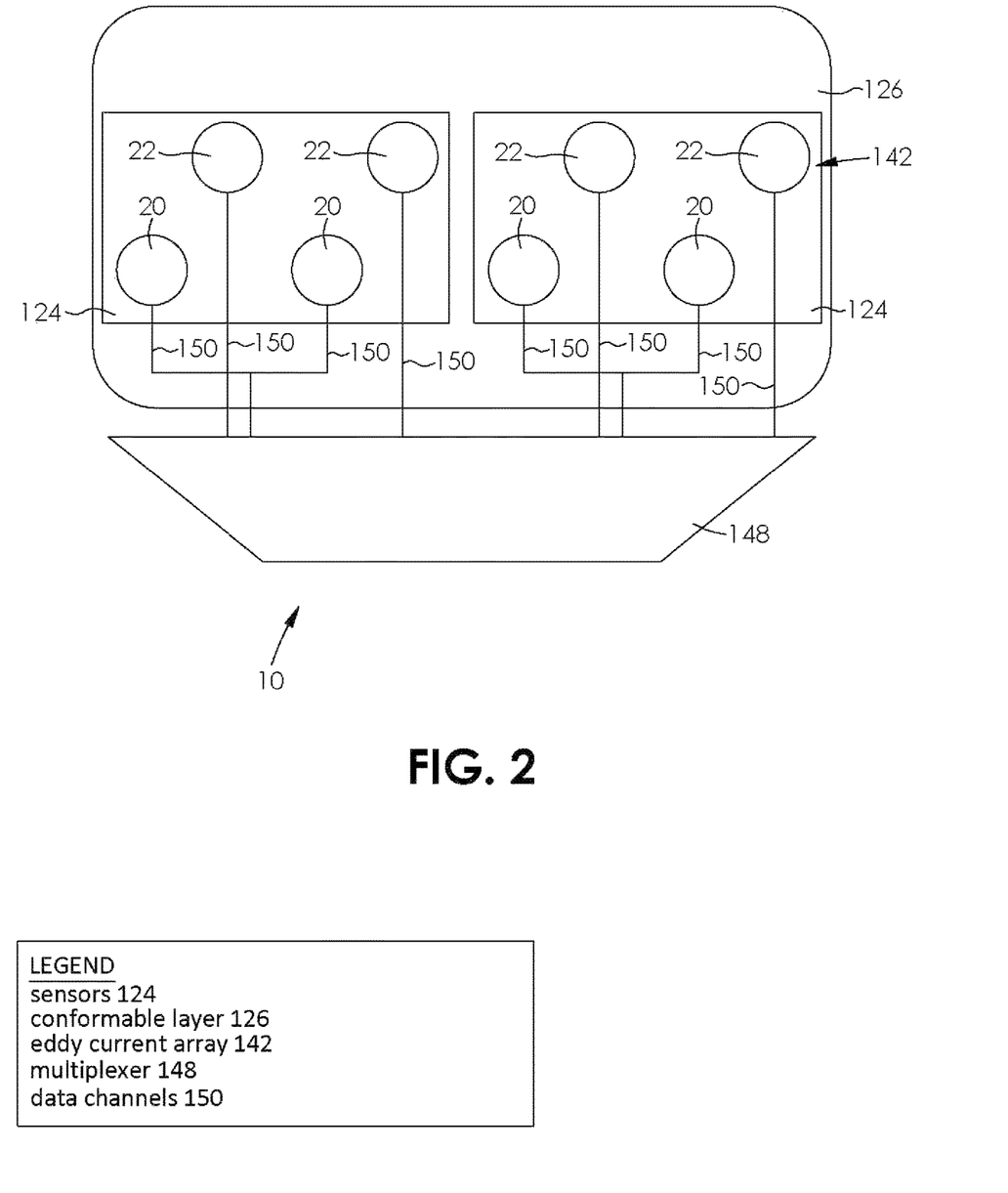
FIG. 2 is schematic of the sensor zone and multiplexer.

As shown in FIG. 2, the sensor zone 16 is comprised of a plurality of sensors 124, embedded in a conformable layer 126. The conformable layer 126 is a flexible layer. Each sensor 124 has a plurality of coils to form an eddy current array, generally referred to as 142. There are at least two rows of coils offset by half a coil. The array 142 is designed to cover the surface to be analyzed. The signals from the eddy current array 142 may pass through a multiplexer 148 in the probe 10 and then to data channels 150. A multiplexer 148 is used when the number of sensing coils 20 for impedance measurement is greater than the number of channels 150.

Figure 3:
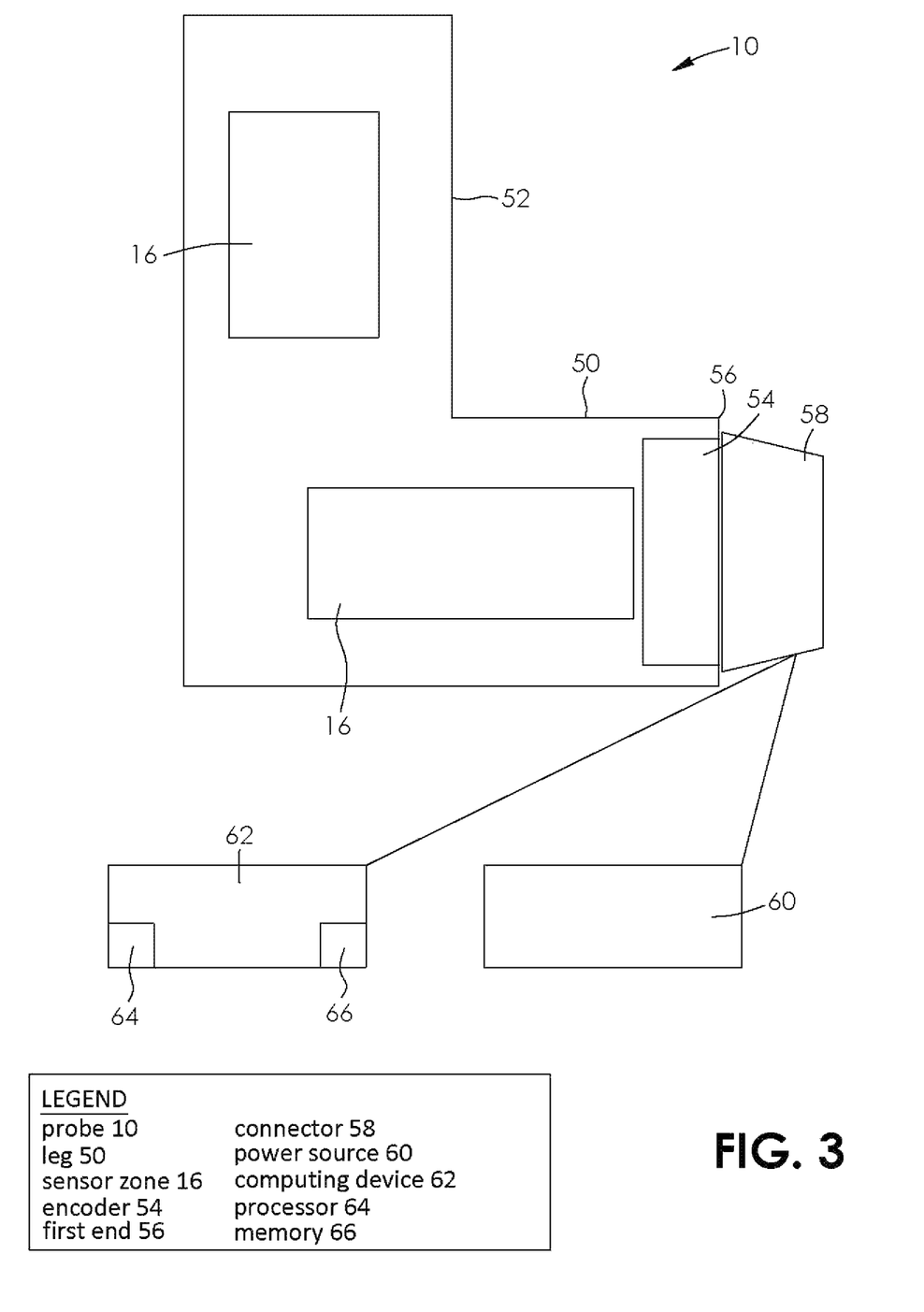
FIG. 3 is a schematic of the system of the present technology.

As shown in FIG. 3, the probe 10 is L-shaped. The L shape allows an operator to use one hand on the leg 50 and the other hand on the arm 52, and by pressing into the gel layer, causing the probe 10 to vary its shape to conform to the surfaces being inspected. Both the leg 50 and the arm 52, which is normal to the leg 50, include a sensor zone 16. An encoder 54 is located at a first end 56 of the leg 50 of the probe 10. A connector 58 is also located at the first end 56 and is for attachment of the probe 10 to a power source 60 and a computing device 62. The computing device 62 includes a processor 64 to receive instructions from a memory 66. Alternatively, the computing device 62 may be integral with the probe 10.

Figure 4:
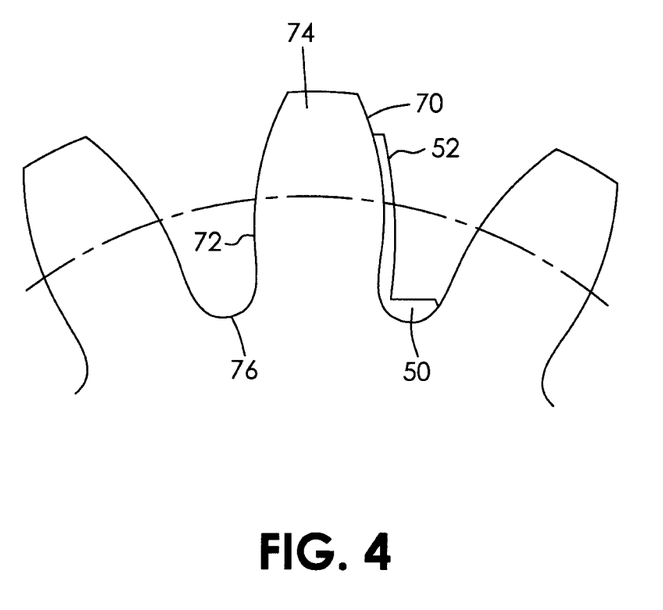
FIG. 4 shows the form-fitting probe in use.

As shown in FIG. 4, the arm 52 conforms to the shape of the addendum 70 and the dedendum 72 of a pinion gear tooth 74 while the leg 50 conforms to the root 76 of the pinion gear tooth 74. It can be noted that the shape of the addendum 70 differs from the shape of the dedendum 72 and therefore the probe shape varies to conform to the different shapes. Further to this, the probe 10 can conform to the shape of different pinion gear teeth 74 as there are a number of different pinion gears that are used in mills and kilns. Still further, the probe 10 can conform to the shape of girth gear sets, which include the helical or pinion gear and the girth gear.

Figure 5:
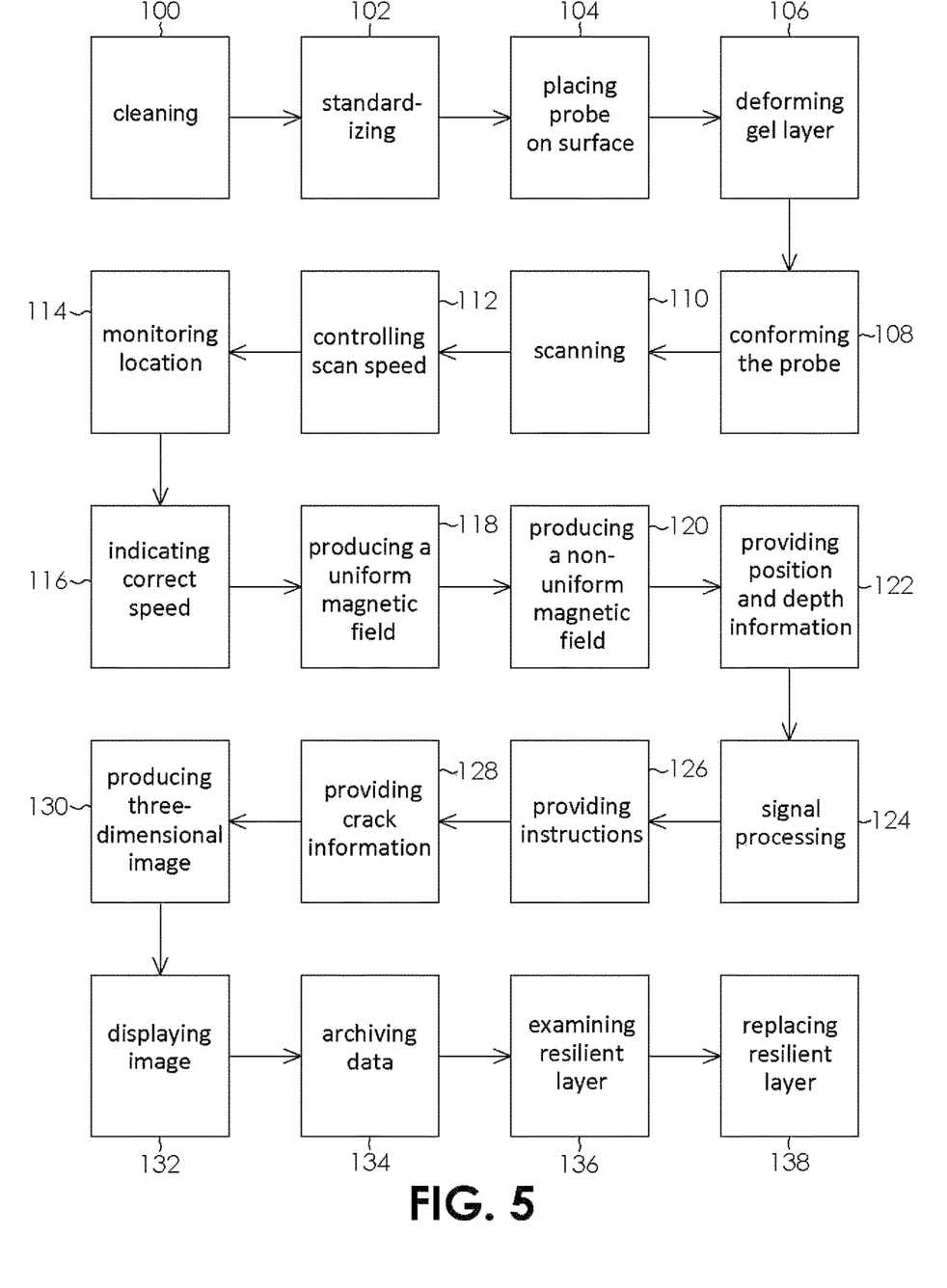
FIG. 5 is a block diagram of the method of the present technology.

An overview of the method is shown in FIG. 5. The method of inspecting a gear takes about 8 hours. The method is used for detecting anomalies and defects in the gears, such as, but not limited to indications, discontinuities and defects. The part to be assessed is cleaned 100. A reference standard is used to standardize 102 all the channels of the array. The probe is placed 104 on the surface of the part to be assessed, the user presses the probe onto the surface, deforming 106 the gel layer and causing the probe to conform 108, in situ, to the shape of the root and adjacent flank and is molded 106 to the surface as the surface is scanned 110 with an alternating current. The addendum, dedendum and root of the gear teeth are all assessed. For the girth gears, the method and the system of the present technology provide a solution to assessing such gears because of the conformability of the probe 10 and the replaceable resilient layer. For pinion gears, the teeth of the gears are arranged in a helix. The angle of the teeth is between about 2 degrees to about 15 degrees, with the more common being between about 7 to about 10 degrees, most commonly between about 7 and about 8 degrees. Pinion gears are more difficult to assess because of the helix angle. For these gears, the method and the system of the present technology provide a solution to assessing such gears because of the flexibility of the probe and the protection and low friction afforded by the Teflon® film.

The scan speed is controlled 112 by the operator, and location is monitored 114 by the encoder. If desired, a Red-Green-Blue (RGB) light source may be included in the probe which then indicates 116 whether the speed is within the correct range. If there are no defects the alternating current produces 118 a uniform magnetic field above the surface. If there are defects, the alternating current leads 120 to a non-uniform magnetic field. The signal provides 122 position and depth information. This signal is then processed 124 by the processor using instructions provided 126 by the memory to provide 128 depth, length and position information with regard to cracks. Data can be analyzed from individual coil channels or for the entire surface. A three-dimensional image is produced 130 and displayed 132 on the user interface. The data are archived 134 in the memory for future reference. The probe will detect both subsurface and surface discontinuities, thereby providing a complete assessment of the integrity of the gear. In the case of the conformable probe, the resilient layer is examined 136 for wear and is replaced 138 as needed. There is no need for re-standardization as the resilient layer is preferably a removable UHMW adhesive-backed flexible plastic film, which is provided as a standardized film of consistent thickness or, less preferably, is a non-adhesive resilient surface that is glued to the sensor layer or the conformable layer, depending upon the probe with a releasable adhesive layer. The use of a replaceable resilient surface provides three advantages. The first is that the resilient layer/surface is all that needs to be replaced, thus reducing the cost that is normally associated with probe wear. The second is that there is no need for re-standardization, as the layer/surface can be replaced when the wear is still within tolerance limits. The third is that the replacement does not alter probe performance, as it is a standardized thickness, therefore there is no need for re-standardization after replacement of the resilient layer/surface.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

What is claimed is:

1. A method of inspecting an at least one tooth of a gear on site, the tooth include a root, an adjacent addendum and an adjacent dedendum, the method comprising:
   selecting a handheld, form-fitting, flexible eddy current array probe, the handheld, form-fitting eddy current array probe comprising a first sensor zone with a plurality of first eddy current arrays, a resilient layer underlying the sensor zone;
   a user pressing the handheld, form-fitting, flexible eddy current array probe onto the root and both the adjacent addendum and the adjacent dedendum of the tooth with the user's hand at a force sufficient for the handheld, form-fitting, flexible probe to mold, in situ, to the root and both the adjacent addendum and the adjacent dedendum to provide a handheld, form-fitting, flexible, molded probe; and
   scanning the root and both the adjacent addendum and the adjacent dedendum with the handheld, form-fitting, flexible, molded probe.

2. The method of claim 1, wherein the gear is a helical gear or a girth gear.

3. The method of claim 2, wherein the helical gear has a tooth angle of about 7 degrees to about 10 degrees.

4. The method of claim 3, wherein the helical gear has a tooth angle of about 7 degrees to about 8 degrees.

5. The method of claim 4, further comprising inspecting a plurality of teeth.

6. The method of claim 2, further comprising inspecting a plurality of teeth from a girth gear set.

7. The method of claim 1, wherein the first sensor zone is in a leg and a second sensor zone is in an arm, which is normal to the leg.

8. The method of claim 7, further comprising an encoder which is distally located on the leg.

9. A method of inspecting an at least one pinion gear on site using a system comprising
   a handheld, form-fitting, flexible eddy current sensor array probe in electronic communication with a computing device,
   the computing device having a processor and a memory,
   the memory to provide instructions to the processor, the handheld, form-fitting, flexible eddy current sensor array probe comprising:
   a first sensor zone with a plurality of first eddy current arrays; a resilient layer underlying the sensor zone, the method comprising:
   a user pressing the handheld, form-fitting, flexible eddy current array probe onto a root, an adjacent addendum and an adjacent dedendum of each tooth with the user's hand with a force sufficient for the handheld, form-fitting, flexible probe to mold, in situ, to the root, the adjacent addendum and the adjacent dedendum;
   standardizing the handheld, form-fitting, flexible eddy current sensor array probe with a reference standard; scanning the at least one gear with an alternating current; sending a data set to the computing device;
   the computing device analyzing the data set; and the computing device displaying one or more of a two or three-dimensional image of the data set on a user interface.

10. The method of claim 9, further comprising multiplexing the data set.

11. The method of claim 10 further comprising the computing device archiving the data set.

12. The method of claim 11, further comprising inspecting a plurality of teeth from a girth gear and the pinion gear of a girth gear set, thereby inspecting the girth gear set.

13. The method of claim 12, wherein the pinion gear has a tooth angle of about 7 degrees to about 15 degrees.

14. The method of claim 13, wherein the pinion gear has a tooth angle of about 7 degrees to about 8 degrees.

15. The method of claim 14, wherein on site is a mine site.

16. The method of claim 9, wherein the first sensor zone is in a leg and a second sensor zone is in an arm, which is normal to the leg.

17. The method of claim 16, further comprising an encoder which is distally located on the leg.

* * * * *